United States Patent
Thyagarajan et al.

(10) Patent No.: US 11,624,777 B2
(45) Date of Patent: Apr. 11, 2023

(54) SLEW-LOAD CHARACTERIZATION

(71) Applicant: Arm Limited, Cambridge (GB)

(72) Inventors: Sriram Thyagarajan, Austin, TX (US); Pratik Ghanshambhai Satasia, Cedar Park, TX (US); Yew Keong Chong, Austin, TX (US); Andy Wangkun Chen, Austin, TX (US); Mouli Rajaram Chollangi, Fremont, CA (US)

(73) Assignee: Arm Limited, Cambridge (GB)

( * ) Notice: Subject to any disclaimer, the term of this patent is extended or adjusted under 35 U.S.C. 154(b) by 350 days.

(21) Appl. No.: 16/857,144

(22) Filed: Apr. 23, 2020

(65) Prior Publication Data

US 2021/0333320 A1   Oct. 28, 2021

(51) Int. Cl.
*G06F 30/3312* (2020.01)
*G01R 31/28* (2006.01)
*G06F 119/12* (2020.01)

(52) U.S. Cl.
CPC ..... *G01R 31/2882* (2013.01); *G06F 30/3312* (2020.01); *G06F 2119/12* (2020.01)

(58) Field of Classification Search
CPC ............. G06F 30/3312; G06F 2119/12; G06F 30/367; G06F 30/398; G06F 30/39; G06F 2119/06; G06F 30/36; G06F 21/76; G06F 16/2455; G06F 16/90335; G06F 17/00; G06F 21/602; G06F 21/72; G06F 21/85; G06F 3/0601; G06F 3/061; G06F 3/0655; G06F 3/067; G06F 3/0673; G06F 3/0683; G06F 9/44505; G06F 9/4881; G06F 30/33; G06F 30/327; G06F 2111/08; G06F 30/30; G06F 2115/08; G06F 2119/10; G06F 2119/18; G06F 30/00; G06F 30/392; G06F 16/902; G06F 16/9024; G06F 16/90339; G06F 16/90344; G06F 17/15; G06F 2117/08; G06F 30/34; G06F 30/35; G06F 3/011; G06F 3/017; G06F 2203/011; G06F 3/0346; G06F 2111/02; G06F 2203/012; G06F 2203/04806; G06F 2203/04808; G06F 3/013; G06F 3/0304; G06F 3/04845; G06F 3/04847; G06F 3/04883; G06F 30/31; G06F 30/3315; H01L 27/0207; H01L 27/11807; G01R 31/2882
USPC ................................................ 716/110–118
See application file for complete search history.

(56) References Cited

U.S. PATENT DOCUMENTS

| | | | |
|---|---|---|---|
| 10,275,554 B1 * | 4/2019 | Chetin | G06F 30/367 |
| 10,776,547 B1 * | 9/2020 | Gupta | G06F 16/9024 |
| 2018/0137225 A1 * | 5/2018 | Joo | G06F 30/327 |

* cited by examiner

*Primary Examiner* — Binh C Tat
(74) *Attorney, Agent, or Firm* — Pramudji Law Group PLLC; Ari Pramudji

(57) ABSTRACT

Various implementations described herein are related to a method for constructing integrated circuitry and identifying input signal paths, internal signal paths and output signal paths associated with the integrated circuitry. The method may include generating a timing table for slew-load characterization of the input signal paths, the internal signal paths and the output signal paths. The method may include simulating corner points for the timing table, building diagonal points for the timing table based on the simulated corner points, and building remaining points for the timing table based on the simulated corner points and the diagonal points.

20 Claims, 10 Drawing Sheets

200A

Simulation Timing Table 202,202A

|        | islew0 | islew1 | islew2 | islew3 | islew4 | islew5 | islew6 |
|--------|--------|--------|--------|--------|--------|--------|--------|
| cslew0 | Sim-1 |     |        |        |        |        |        |
| cslew1 |        |        |        |        |        |        |        |
| cslew2 |        |        |        |        |        |        |        |
| cslew3 |        |        |        |        |        |        |        |
| cslew4 |        |        |        |        |        |        |        |
| cslew5 |        |        |        |        |        |        |        |
| cslew6 |        |        |        |        |        |        | Sim-2 |

FIG. 2A

| | islew0 | islew1 | islew2 | islew3 | islew4 | islew5 | islew6 |
|---|---|---|---|---|---|---|---|
| cslew0 | Sim-1 | | | | | | |
| cslew1 | | Sim-7 | | | | | |
| cslew2 | | | Sim-6 | | | | |
| cslew3 | | | | Sim-3 | | | |
| cslew4 | | | | | Sim-5 | | |
| cslew5 | | | | | | Sim-4 | |
| cslew6 | | | | | | | Sim-2 |

Simulation Timing Table 202,202B

FIG. 2B

| | islew0 | islew1 | islew2 | islew3 | islew4 | islew5 | islew6 |
|---|---|---|---|---|---|---|---|
| cslew0 | Sim-1 | sim | sim | sim | sim | sim | sim |
| cslew1 | sim | Sim-7 | sim | sim | sim | sim | sim |
| cslew2 | sim | sim | Sim-6 | sim | sim | sim | sim |
| cslew3 | sim | sim | sim | Sim-3 | sim | sim | sim |
| cslew4 | sim | sim | sim | sim | Sim-5 | sim | sim |
| cslew5 | sim | sim | sim | sim | sim | Sim-4 | sim |
| cslew6 | sim | sim | sim | sim | sim | sim | Sim-2 |

Simulation Timing Table 202,202C

SLEW-LOAD CHARACTERIZATION

BACKGROUND

This section is intended to provide information relevant to understanding various technologies described herein. As the section's title implies, this is a discussion of related art that should in no way imply that it is prior art. Generally, the related art may or may not be considered prior art. It should therefore be understood that any statement in this section should be read in this light, and not as any admission of prior art.

In reference to conventional circuit designs, when generating accurate timing, an output transition current profile, and on-chip variation data for slew/load combination points, each timing/power point needs a specific calculation for derivation of timing data. In some cases, an output delay transition current waveform in a liberty model is often needed to have more accurate simulator settings to capture proper waveforms. Unfortunately, this accuracy typically increases simulation run-time for delay arcs. Also, on-chip variation data is captured by running Monte-Carlo simulations, and also, to accurately capture on-chip variation data, all points need to be simulated with Monte-Carlo simulations. Unfortunately, the capturing of accurate data for all timing arcs requires large simulation run-time overhead. As such, there exists a need to improve simulation run-time overhead for circuit designs.

BRIEF DESCRIPTION OF THE DRAWINGS

Implementations of various techniques are described herein with reference to the accompanying drawings. It should be understood, however, that the accompanying drawings illustrate only various implementations described herein and are not meant to limit embodiments of various techniques described herein.

FIGS. 2A-2C illustrate various timing diagrams of simulation timing tables in accordance with various implementations described herein.

DETAILED DESCRIPTION

Various implementations described herein relate to chip-level integrated circuit (IC) design schemes and techniques for implementing various efficient slew-rate characterization methodologies in physical structures. The various schemes and techniques described herein may provide for generating timing, power and/or liberty variation format (LVF) model data for slew/load variation in reference to setup, hold, delay and/or pin-power arcs by running only an optimum number of simulations that meet a desired accuracy when simulation run-time is needed to characterize these timing arcs. The liberty model may include timing/power data with multiple clock slews, input slews and/or output loads depending on the timing arcs. The LVF model data may refer to new industry standard models for system-on-chip (SoC) based implementations. In addition to non-linear delay (NLD) timing data, the LVF model data may include accurate output transition data based on current waveforms and/or 1-sigma on-chip variation data for delay, setup, and hold timing arcs. The output transition current waveform and/or 1-sigma on-chip variation data may need to be simulated and reported for all slew/load point combinations, and this information may be needed since memory instances are used in different applications at SoC chip-level. Based on the SoC implementations, slew of inputs arriving to memory may vary, and similarly, memory output load connection at the SoC may vary depending on the input/output connections and distance travelled. In some instances, place-and-route tools may use timing information that is present in the liberty model to include slew/load combination points of timing closures for memory applications. For instance, if a slew timing table refers to 7×7 indexes in a liberty model, then 49 timing/power data points will need simulation values for each 7 clock slews and 7 input-slew/output-load combinations for each timing/power arc. It should be appreciated that this 7×7 table (49 points) refers to one example only, and as such, this simulation technique may be applied to and implemented in any size of timing table (e.g., 4×4, 5×5, 6×6, 7×7, 8×8, 10×10, etc.).

Various implementations of slew-load characterization layout design schemes and techniques will be described in detail herein with reference to FIGS. 1A-6.

Figure 1A:
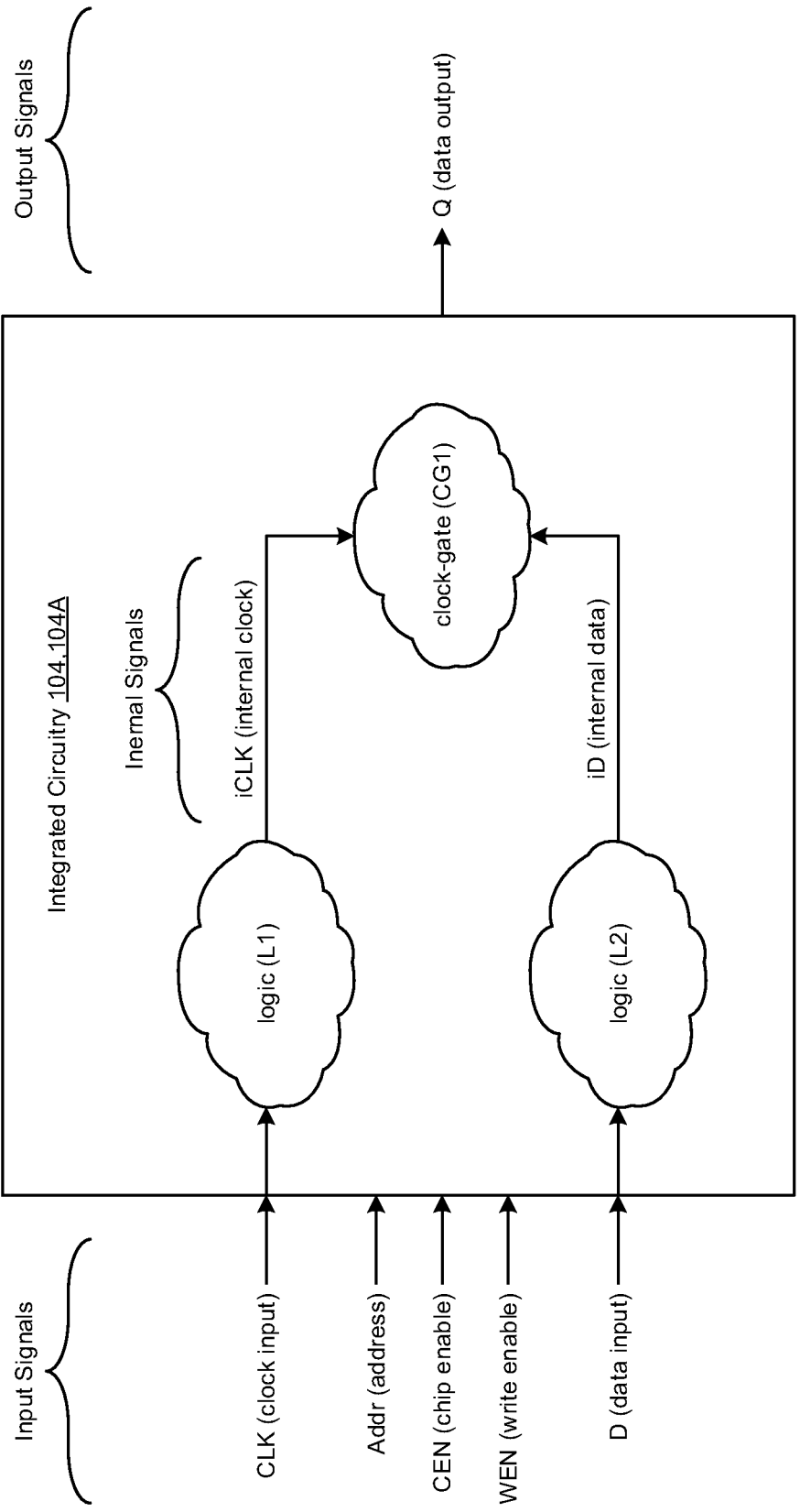
FIGS. 1A-1C illustrate various diagrams of chip-level circuitry in accordance with various implementations described herein.
Figure 1B:
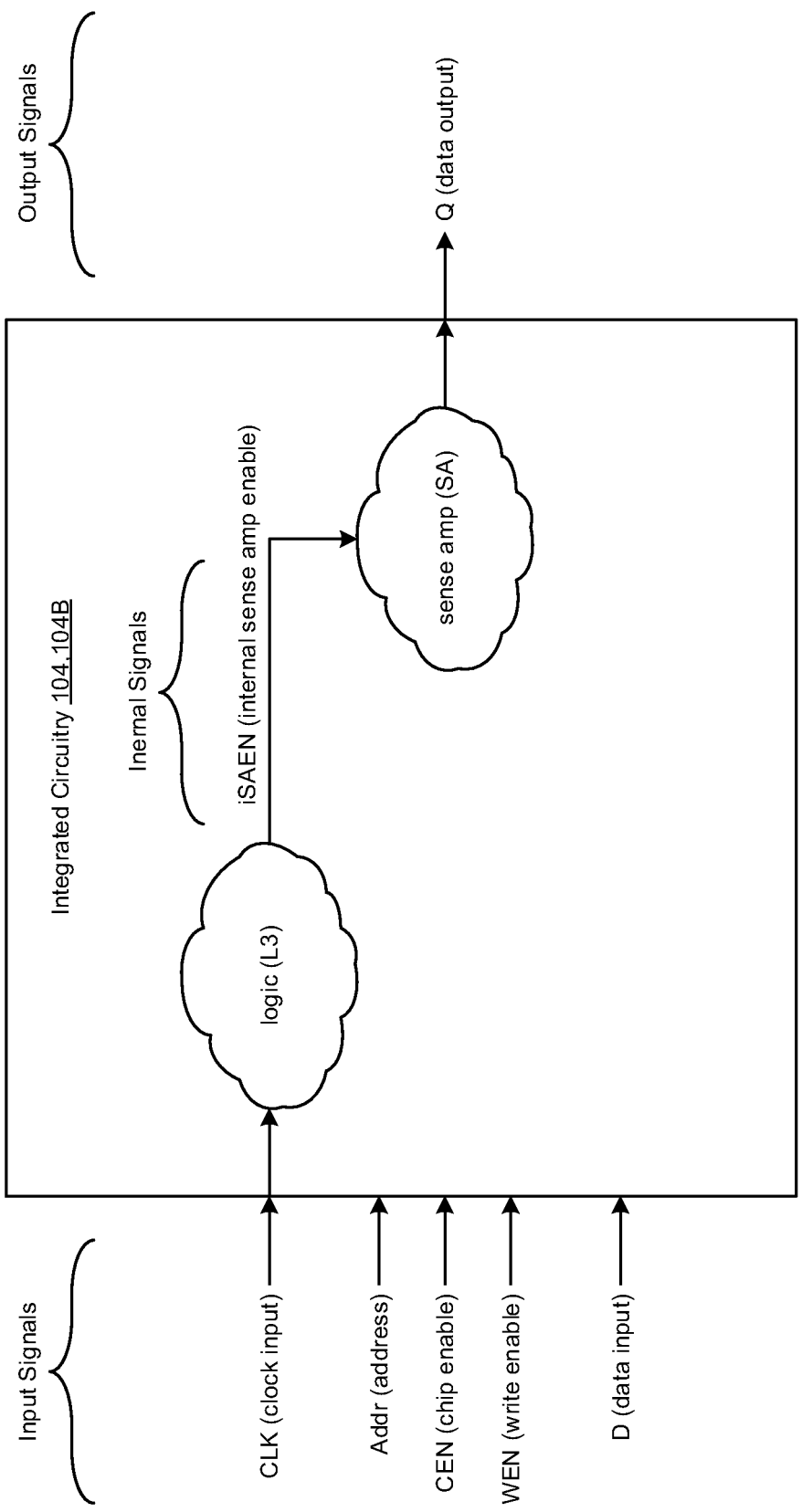
Figure 1C:
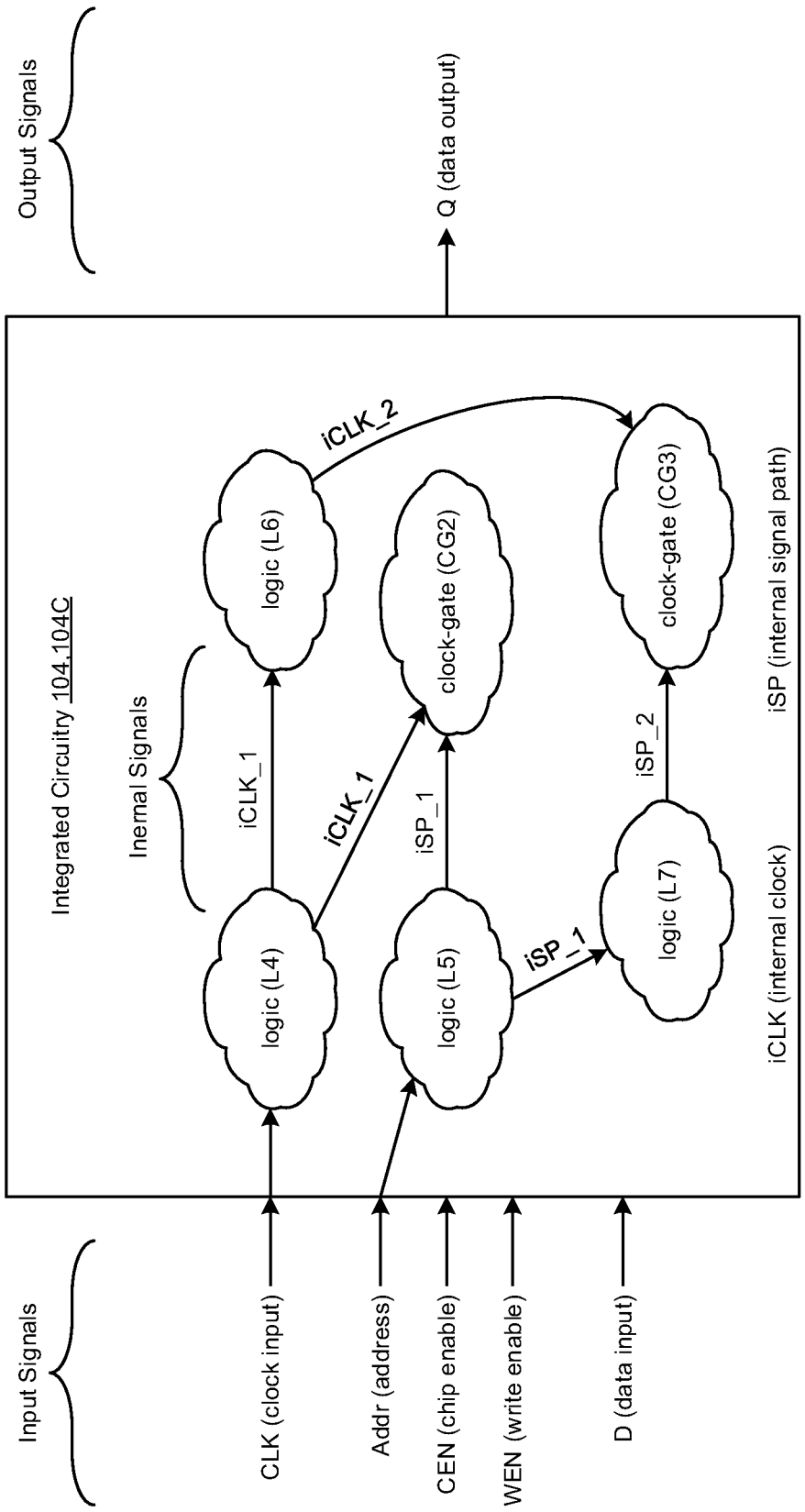

FIGS. 1A-1C illustrate diagrams of chip-level circuitry 102 with integrated circuitry (IC) 104 in accordance with various implementations described herein. In some instances, the integrated circuitry 104 may be implemented as a system or device having various circuit components that are arranged and coupled together as an assemblage or combination of parts that provide for a physical circuit design and various related structures. Also, in some instances, a method of designing, providing and building the integrated circuitry 104 may involve use of the various circuit components described herein so as to thereby implement slew-load characterization methodologies associated therewith.

In particular, FIG. 1A shows a diagram 100A of chip-level circuitry 102A having integrated circuitry (IC) 104A, FIG. 1B shows another diagram 100B of chip-level circuitry 102B having integrated circuitry (IC) 104B, and also, FIG. 1C shows another diagram 100C of chip-level circuitry 102C having integrated circuitry (IC) 104C.

As shown in FIG. 1A, the integrated circuitry 104A may refer to a circuit design having first logic circuitry (L1), second logic circuitry (L2), and first clock-gate circuitry (CG1) that are arranged and configured to receive and map one or more input signals (e.g., CLK, Addr, CEN, WEN, D) to one or more internal signals (e.g., iCLK, iD) and/or to at least one output signal (e.g., Q). For instance, as shown in FIG. 1A, the first logic circuitry (L1) may receive and map a clock input signal (CLK) from an external source to an internal clock signal (iCLK), which is provided to the clock-gate circuitry (CG1). Also, the second logic circuitry (L1) may receive and map a data input signal (D) from an external source to an internal data signal (iD), which is then provided to the clock-gate circuitry (CG1). Further, in this instance, as part of the internal signal mapping, the clock-gate circuitry (CG1) may receive the internal clock signal (iCLK) from the first logic circuitry (L1), and also, the clock-gate circuitry (CG1) may receive the internal data signal (iD) from the second logic circuitry (L2).

In some implementations, in reference to FIG. 1A, the signal paths associated with the integrated circuitry 104A may be simulated (and/or modelled) with timing arcs, such as, e.g., setup and hold arcs, wherein:

Setup timing=Data Path−Clock (CLK) Path of input Pin

Hold timing=Clock (CLK) Path−Data Path of input Pin

In some instances, both the data paths and clock paths are separately measured for all memory instances to calculate setup and hold timing.

As shown in FIG. 1B, the integrated circuitry 104B may refer to another circuit design having third logic circuitry (L3) and sense amplifier circuitry (SA) that are arranged and configured to receive and map one or more input signals (e.g., CLK, Addr, CEN, WEN, D) to at least one internal signal (e.g., iSAEN), which may be mapped to at least one output signal (e.g., Q). For instance, as shown in FIG. 1B, the third logic circuitry (L3) may receive and map the clock input signal (CLK) from an external source to an internal sense amplifier enable signal (iSAEN), which is provided to the sense amplifier circuitry (SA). As part of the internal signal mapping, the sense amplifier circuitry (SA) may receive the internal sense amplifier enable signal (iSAEN) from the third logic circuitry (L3). Further, the sense amplifier circuitry (SA) may receive and map the internal sense amplifier enable signal (iSAEN) from the third logic circuitry (L3) to the data output signal (Q).

In some implementations, in reference to FIG. 1B, the signal paths associated with the integrated circuitry 104B may be simulated (and/or modelled) with timing arcs, such as, e.g., CLK to Q output delay arcs, wherein CLK to Q output delay is measured directly from CLK input toggle to Q output switching with specific Address and Data inputs.

As shown in FIG. 1C, the integrated circuitry 104C may refer to a circuit design having fourth logic circuitry (L4), fifth logic circuitry (L5), sixth logic circuitry (L6), and seventh logic circuitry (L7) along with second clock-gate circuitry (CG2) and third clock-gate circuitry (CG3) that are arranged and configured to receive and map one or more input signals (e.g., CLK, Addr, CEN, WEN, D) to one or more internal signals (e.g., iCLK_1, iCLK_2, iSP_1, iSP_2) and/or to at least one output signal (e.g., Q).

As shown in FIG. 1C, the fourth logic circuitry (L4) may receive and map the clock input signal (CLK) from an external source to a first internal clock signal (iCLK_1), which is provided to the sixth logic circuitry (L6) and the second clock-gate circuitry (CG2). Also, the sixth logic circuitry (L6) may receive and map the first internal clock signal (iCLK_1) from the fourth logic circuitry (L4) to a second internal clock signal (iCLK_2), which is then provided to the third clock-gate circuitry (CG3). The second clock-gate circuitry (CG2) may receive the first internal clock signal (iCLK_1) from the fourth logic circuitry (L4). Also, the fifth logic circuitry (L5) may receive and map the address input signal (Addr) from an external source to a first internal signal path (iSP_1), which is provided to the second clock-gate circuitry (CG3) and the seventh logic circuitry (L7). Also, the seventh logic circuitry (L7) may receive and map the first internal clock signal (iCLK_1) from the fifth logic circuitry (L5) to a second internal signal path (iSP_2), which is then provided to the third clock-gate circuitry (CG3).

Also, in this instance, as part of the internal signal mapping, the sixth logic circuitry (L6) may receive the first internal clock signal (iCLK_1) from the fourth logic circuitry (L4), the second clock-gate circuitry (CG2) may receive the first internal clock signal (iCLK_1) from the fourth logic circuitry (L4), and the second clock-gate circuitry (CG2) may receive the first internal signal path (iSP_1) from the fifth logic circuitry (L5). Also, in this instance, the third clock-gate circuitry (CG3) may receive the second internal signal path (iSP_2) from the seventh logic circuitry (L7), and the third clock-gate circuitry (CG3) may receive the second internal clock signal (iCLK_2) from the sixth logic circuitry (L6).

In some implementations, other input signals (that may be mapped to various other internal logic circuitry) may include a chip enable signal (CEN) and/or a write enable (WEN) signal. In some instances, the integrated circuitry 104 may be implemented with one or more semiconductor chips and/or dies with embedded systems for various electronic, mobile and Internet-of-things (IoT) applications, including low power sensor nodes.

FIGS. 2A-2C illustrate various timing related diagrams of a simulation timing table 202 in accordance with implementations described herein. In particular, FIG. 2A shows a first simulation timing table 200A for generating simulations of the slew-load characterization, FIG. 2B shows a second simulation timing table 200B for generating additional simulations of the slew-load characterization, and also, FIG. 2C shows a third simulation timing table 200C for generating remaining simulations of the slew-load characterization.

In various implementations, the simulation timing table 202 may be generated for the chip level circuitry 102 (associated with the logic and signal paths of FIGS. 1A-1C) for slew-load characterization of the input signal paths, the internal signal paths and/or the output signal paths. For instance, as shown in FIG. 2A, generating the first timing table 202A may include simulating corner points (Sim-1, Sim-2) for the timing table 202. As shown in FIG. 2B, generating the second timing table 202B may include building diagonal points (Sim-3, Sim-4, Sim-5, Sim-6, Sim-7) for the timing table 202 using the simulated corner points (Sim-1, Sim-2) and using geometric progression interpolation. As shown in FIG. 2C, generating the third timing table 202C may include building remaining points (sim) for the timing table 202 using a delta approach. In various instances, the slew-load characterization may refer to timing, power and/or model data for slew/load variation for setup, hold, delay and/or pin-power arcs. Also, the model data may include liberty variation format (LVF) model data and non-linear delay (NLD) model data for slew/load variation.

As shown in FIGS. 2A-2C, the timing table may include multiple points arranged in a two-dimensional (2D) grid pattern with columns and rows, and the multiple points may have point values associated with simulation values. In some instances, the columns may refer to a number of input slew columns (islew0, islew1, . . . , islew6), and also, the rows may refer to a number of clock slew rows (cslew0, cslew1, . . . , cslew6). The timing table may include a scalable number (S) of points that are arranged with a first number (N) of columns and with a second number (M) of rows, and also, the scalable number of points may include (S=N*M) points that are arranged with N columns and with M rows.

For instance, as shown in FIGS. 2A-2C, the scalable number (S) of points may refer to forty-nine (49) points, and the first number (N) of columns may refer to seven (7) columns, and the second number (M) of rows may refer to seven (7) rows. In reference to FIG. 2A, the corner points for the first timing table 202A may refer to a first corner point (Sim-1) and also a second corner point (Sim-2) that is opposite the first corner point (Sim-1). In reference to FIG. 2B, the diagonal points for the timing table 202B may refer to the five (5) diagonal points (Sim-3, Sim-4, Sim-5, Sim-6, Sim-7) along a central diagonal between the first corner point (Sim-1) and the second corner point (Sim-2). Further, in reference to FIG. 2C, the remaining points for the timing table 202C may refer to forty-two (42) remaining points (sim) that fill the timing table 202C above and below the central diagonal.

In some implementations, in reference to FIGS. 1A-1C and 2A-2C, the various simulated signal paths associated with the integrated circuitry 104 and the simulation timing table 202 may be simulated (and/or modelled) with timing arcs, such as, e.g., setup and hold arcs, delay arcs, and/or LVF model data.

In some instances, in reference to setup and hold arcs:

By running diagonal clock slews and input slews, the simulation points may cover all 7 clock slews and all 7 input slews. With 7 simulations along the diagonal of the 7×7 table, the data path may be measured for each 7 input slews, and the clock path may be measured for each 7 clock slews correspondingly. Using this data, the remaining points may be derived in the following manner:

Setup-time @ CSIew1 ISlew0=Data-delay @
ISlew0−Clock-delay @ CSIew1

Setup-time @ CSIew2 ISlew0=Data-delay @
ISlew0−Clock-delay @ CSIew2

Setup-time @ CSIew0 ISIew6=Data-delay @
ISIew6−Clock-delay @ CSIew0

Also, in reference to delay arcs:

CLK to Q delay=CLK_to_sae (Sense-amp enable)+Sae_to_Q

CLK_to_sae measured component is capturing impact on total delay due to each clock slew.

Sae_to_Q measured component is capturing impact on total delay due to each output load.

By running diagonal clock slews and output loads, the simulation points may cover all 7 clock slews and all 7 output loads. Using this data, the remaining delay points may be derived in the following manner:

delay @ CSIew1 Oload0=CLK_to_sae-delay @
CSIew1+sae_to_Q-delay @ Oload0 delay @ CSIew2 Oload0=CLK_to_sae-delay @
CSIew2+sae_to_Q-delay @ Oload0 delay @ CSIew0 Oload1=CLK_to_sae-delay @
CSIew0+sae_to_Q-delay @ Oload1

In some instances, an accurate Q output waveform may be captured with 7 output load simulations, which may be used for current related waveforms. Also, this may be used to capture both rise/fall edge of the output-Q.

Further, in reference to LVF models:

The on-chip variation (OCV) 1-sigma data may be included for setup, hold, delay, retain and/or output transition arcs for 7×7 (49 slew/load combination) points. Also, in some instances, the 1-sigma OCV data may be calculated by using the same diagonal slew/load indexes and by derating all 49 simulation points. This may provide drastic run-time reduction for overall characterization with minimal accuracy loss. In addition, this scheme may provide accurate 1-sigma OCV data when compared to other existing methods of using a crit-based netlist or some other technique of only reporting for output load variation.

OCV delay @ CSIew1 Oload0=OCV CLK_to_sae-delay @ CSIew1+OCV sae_to_Q-delay @ Oload0

OCV delay @ CSIew2 Oload0=OCV CLK_to_sae-delay @ CSIew2+OCV sae_to_Q-delay @ Oload0

OCV delay @ CSIew0 Oload1=OCV CLK_to_sae-delay @ CSIew0+OCV sae_to_Q-delay @ Oload1

Accordingly, in some implementations, simulation points in simulation timing table 202 in FIG. 2A-2C may be generated using the various slew-load characterization schemes and techniques described herein. For instance, schemes and techniques described herein may be used to reduce the 49-point simulations to 3-7 diagonal reference slew/load points to derate the full 49 points timing table for all timing/power arcs. Based on the desired accuracy needs, schemes and techniques described herein may vary from a minimum of 3-simulations to a maximum of 7-simulations instead of the full 49-point simulations.

In some implementations, as described herein below in reference to FIGS. 3-5, the following sequence of events may be used to provide slew-load characterization schemes and techniques in a manner as described herein.

1. From the timing table 202A in FIG. 2A, the simulation process may start with simulating only 2 corner-points of the timing table 202, as named Sim-1 and Sim-2.

2. From the timing table 202B in FIG. 2B, the simulation process may calculate five points (e.g., Sim-3, Sim-4, Sim-5, Sim-6, Sim-7) along the central diagonal using, e.g., a geometric progression interpolation technique.

3. In some cases, the simulation process may check whether the Sim-1, Sim-2 interpolated line is linear within the set tolerance of the remaining un-simulated points.

3a. If YES, then the five sim points along the central diagonal may be considered accurate by construction, and the simulation process proceeds.

3b. If NO, then the simulation process may simulate an extra slew-point along the diagonal (which may be falling away from the interpolated line) and repeat operation (3) with one or more additional simulation points.

3c. Worst case, all the diagonal points (Sim-1, Sim-2, . . . , Sim-7) may have to be simulated based on the accuracy and/or linearity.

4. Once the central diagonal points are built, the simulation process may build the remaining points in the timing table 202C (e.g., the remaining 42 sim points) using the delta approach mentioned herein above. In some instances, these 7 central diagonal points may be enough to achieve 100% accuracy for building the remaining 42 points in the simulation timing table 202C, e.g., as shown in FIG. 2C. The example in FIGS. 2A-2C provides for a 7×7 timing table. However, similar results may be achieved with different sized tables, such as, e.g., 4×4, 5×5, 6×6, 8×8, 10×10 timing tables or even larger.

Figure 3:
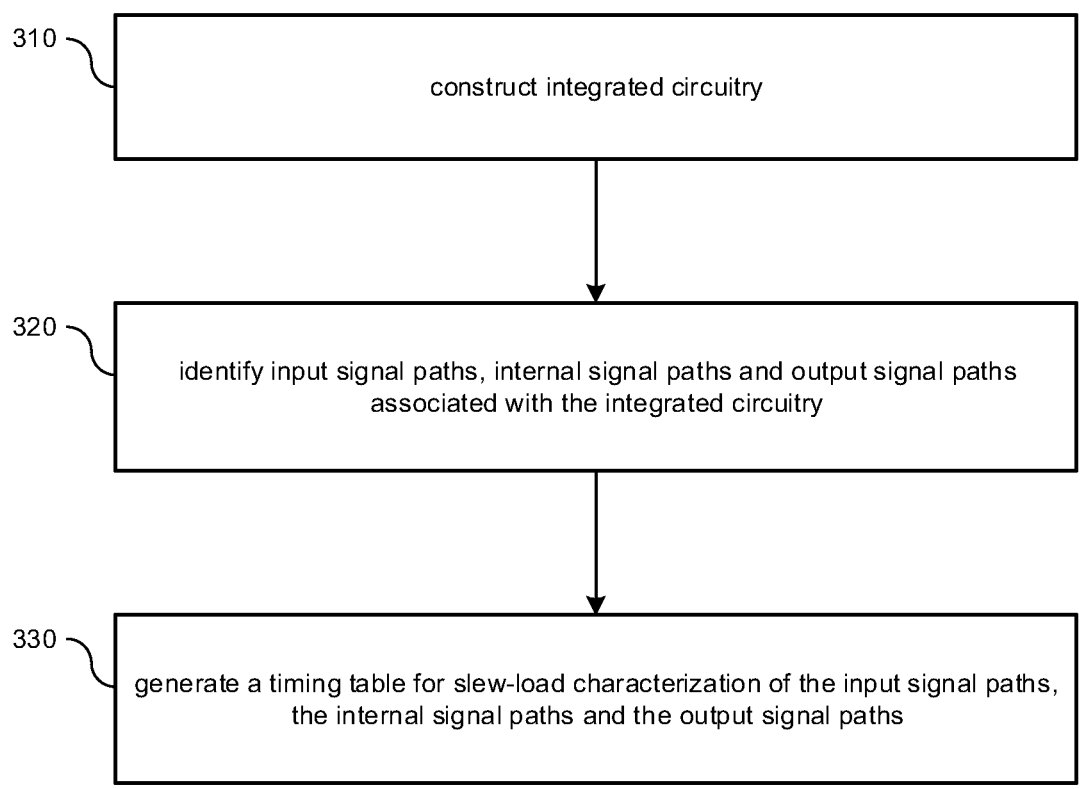
FIGS. 3-5 illustrate various process diagrams of methods for providing slew-load characterization in accordance with implementations described herein.
Figure 4:
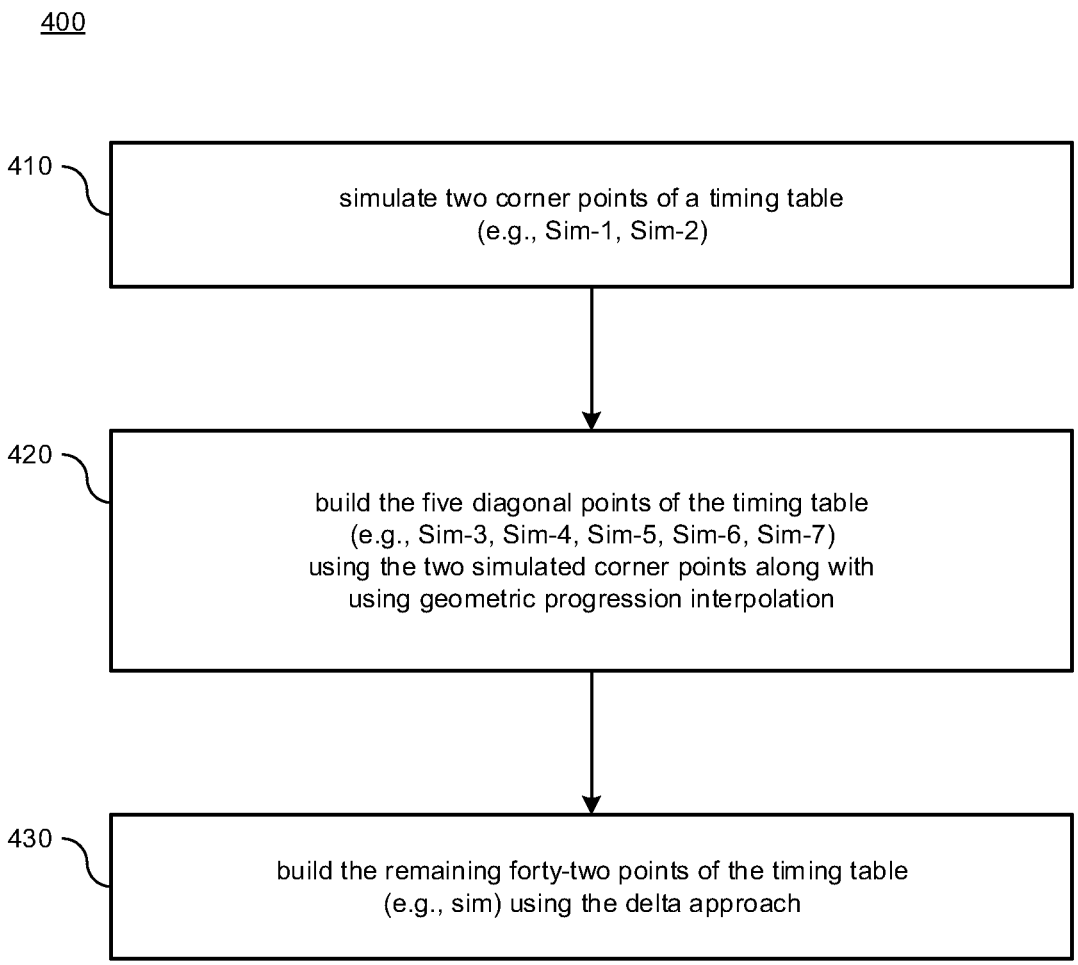
Figure 5:
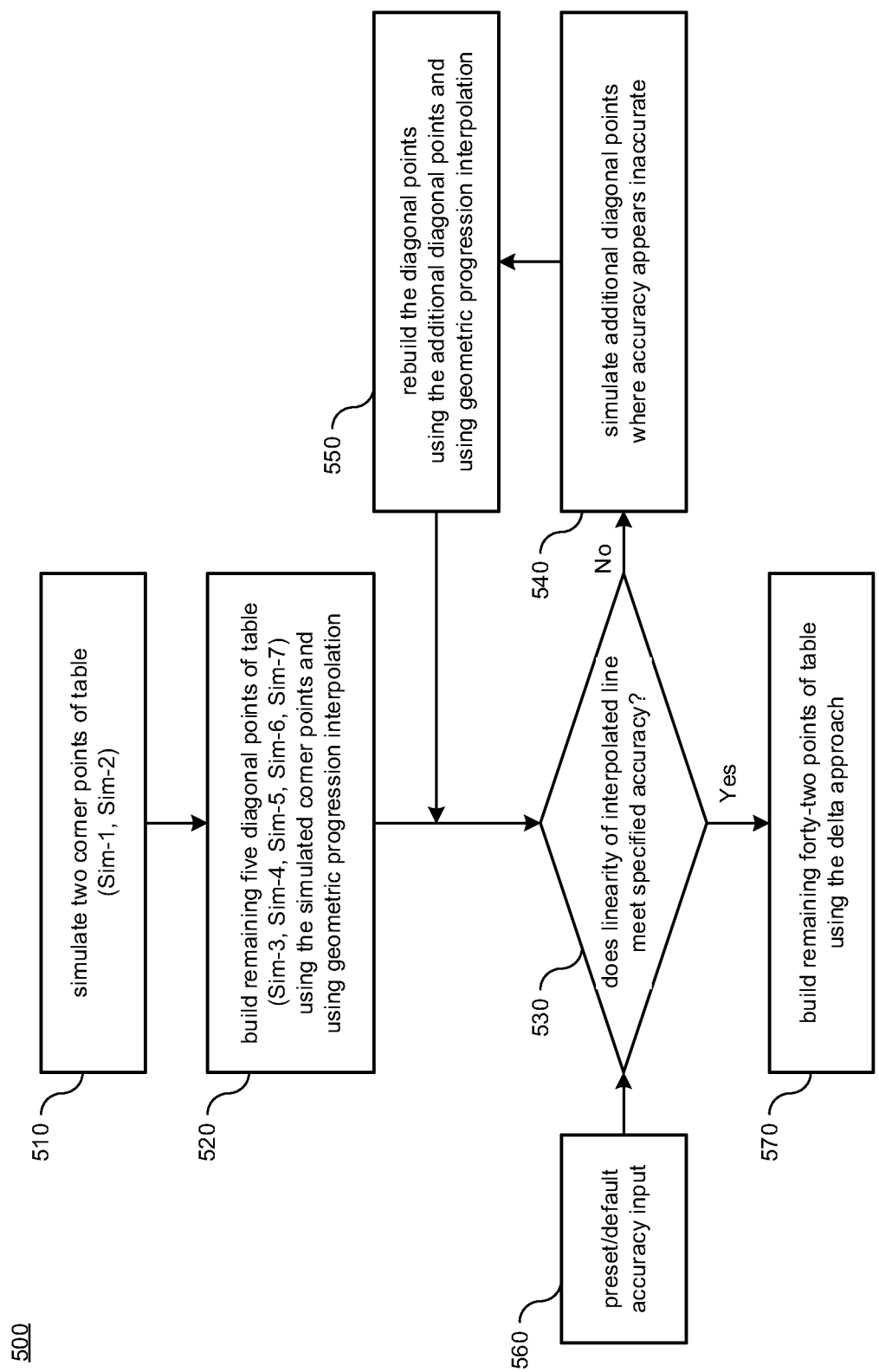

FIGS. 3-5 illustrate various process flow diagrams of methods for providing slew-load characterization schemes and techniques in accordance with various implementations described herein. In particular, FIG. 3 shows a process flow diagram of a method 300 for providing slew-load characterization techniques in physical design, FIG. 4 shows another process flow diagram of a method 400 for providing slew-load characterization techniques in physical design, and also, FIG. 5 shows another process flow diagram of another method 500 for providing slew-load characterization techniques in physical design.

As shown in FIG. 3, method 300 may be used to build (or generate, or fabricate) integrated circuitry, such as, e.g., various physical layout designs. It should be understood that even though method 300 may indicate a particular order of operation execution, in some cases, various certain portions of the operations may be executed in a different order, and on different systems. In other cases, some additional operations and/or steps may be added to and/or omitted from method 300. Also, method 300 may be implemented in hardware and/or software. If implemented in hardware, method 300 may be implemented with various circuit elements, such as described herein in reference to FIGS. 1A-2C. If implemented in software, method 300 may be implemented as a program and/or software instruction process that may be configured for slew-load characterization as described herein. If implemented in software, instructions related to implementing method 300 may be stored in memory and/or a database. For instance, a computer or various other types of computing devices having a processor and memory may be configured to perform method 300.

As described and shown in reference to FIG. 3, method 300 may be used for designing, creating, routing, fabricating and/or manufacturing an integrated circuit (IC) that implements various slew-load characterization methodologies described herein. Also, in reference to FIG. 3, method 300 may be configured to translate the physical design of an integrated circuit (IC) while preserving logical behaviors and characteristics.

At block 310, method 300 may construct integrated circuitry. In some instances, the integrated circuitry may refer to chip-level circuitry for a system-on-a-chip (SoC). In some instances, constructing the integrated circuitry may refer to generating a liberty model for the integrated circuitry having timing data and power data with multiple clock slews, multiple input slews and/or multiple output loads depending on a timing arc.

At block 320, method 300 may identify input signal paths, internal signal paths and output signal paths associated with the integrated circuitry. In some implementations, the input signal paths may refer to input clock signal paths and input data signal paths associated with various logic within the integrated circuitry. Also, the internal signal paths may refer to internal clock signal paths and internal data signal paths associated with the various logic within the integrated circuitry. Further, the output signal paths may refer to delay signal paths associated with output from the integrated circuitry.

Also, at block 330, method 300 may generate (or develop) a timing table for slew-load characterization of the input signal paths, the internal signal paths and the output signal paths. In some instances, generating the timing table may include simulating corner points for the timing table, building diagonal points for the timing table using the simulated corner points and using geometric progression interpolation, and building remaining points for the timing table using a delta approach. In some instances, the slew-load characterization refers to timing, power and/or model data for slew/load variation for setup, hold, delay and/or pin-power arcs. Also, the model data may include liberty variation format (LVF) model data and non-linear delay (NLD) model data for slew/load variation.

In various implementations, the timing table may include multiple points arranged in a two-dimensional (2D) grid pattern with columns and rows, and the multiple points may have point values associated with simulation values. The timing table may include a scalable number (S) of points that are arranged with a first number (N) of columns and with a second number (M) of rows, and also, the scalable number of points may include (S=N*M) points that are arranged with N columns and with M rows. For instance, the scalable number (S) of points refers to forty-nine (49) points, wherein the first number (N) of columns may refer to seven (7) columns, and the second number (M) of rows may refer to seven (7) rows. In this instance, the corner points for the timing table refer to a first corner point and a second corner point that is opposite the first corner point, the diagonal points for the timing table refer to five (5) diagonal points along a central diagonal between the first corner point and the second corner point, and the remaining points for the timing table refer to forty-two (42) remaining points that fill the timing table above and below the central diagonal.

As shown in FIG. 4, method 400 may be used to simulate (or generate, or build) a timing table for various physical layout designs. It should be understood that even though method 400 may indicate a particular order of operation execution, in some cases, portions of operations may be executed in a different order, and on different systems. In other cases, additional operations and/or steps may be added to and/or omitted from method 400. Also, method 400 may be implemented in software. If implemented in software, method 400 may be implemented as a program and/or software instruction process that may be configured for slew-load characterization as described herein. Also, if implemented in software, instructions related to implementing method 400 may be stored in memory and/or a database. Also, in some instances, a computer or various other types of computing devices having a processor and memory may be configured to perform method 400.

As described and shown in reference to FIG. 4, method 400 may be used for designing, creating, routing, building and/or generating simulations for integrated circuitry that implements various slew-load characterization methodologies described herein. Also, in reference to FIG. 4, method 400 may be configured to translate the physical design of an integrated circuit (IC) while preserving logical behaviors and characteristics.

At block 410, method 400 may simulate two corner points of a simulation timing table. For instance, in reference to FIG. 2A, the corner points for the first timing table 202A may refer to a first corner point (Sim-1) and a second corner point (Sim-2) that is opposite the first corner point (Sim-1).

At block 420, method 400 may build the five diagonal points of the simulation timing table using the two simulated corner points and using geometric progression interpolation. For instance, in reference to FIG. 2B, the diagonal points for the timing table 202B may refer to five (5) diagonal points (Sim-3, Sim-4, Sim-5, Sim-6, Sim-7) along a central diagonal between the first corner point (Sim-1) and the second corner point (Sim-2).

At block 430, method 400 may build the remaining forty-two points of the simulation timing table using the delta approach. For instance, in reference to FIG. 2C, the remaining points for the timing table 202C may refer to forty-two (42) remaining points (sim) that fill the timing table 202C above and below the central diagonal.

In some instances, as shown in FIGS. 2A-2C, the scalable number (S) of points may refer to forty-nine (49) points, and the first number (N) of columns may refer to seven (7) columns, and the second number (M) of rows may refer to seven (7) rows. However, it should be appreciated that the simulation timing table may be scalable to any number of simulated points. For instance, in various instances, the simulation timing table may include a scalable number (S) of points that are arranged with a first number (N) of columns and a second number (M) of rows, and also, the scalable number of points includes (S=N*M) points that are arranged with N columns and M rows.

As shown in FIG. 5, method 500 may be used to simulate (or generate, or build) a timing table for various physical layout designs. It should be understood that even though method 500 may indicate a particular order of operation execution, in some cases, portions of operations may be executed in a different order, and on different systems. In other cases, additional operations and/or steps may be added to and/or omitted from method 500. Also, method 500 may be implemented in software. If implemented in software, method 500 may be implemented as a program and/or software instruction process that may be configured for slew-load characterization as described herein. Also, if implemented in software, instructions related to implementing method 500 may be stored in memory and/or a database. Also, in some instances, a computer or various other types of computing devices having a processor and memory may be configured to perform method 500.

As described and shown in reference to FIG. 5, method 500 may be used for designing, creating, routing, building and/or generating simulations for integrated circuitry that implements various slew-load characterization methodologies described herein. Also, in reference to FIG. 5, method 500 may be configured to translate the physical design of an integrated circuit (IC) while preserving logical behaviors and characteristics.

At block 510, method 500 may simulate two corner points of a simulation timing table. For instance, in reference to FIG. 2A, the corner points for the first timing table 202A may refer to a first corner point (Sim-1) and a second corner point (Sim-2) that is opposite the first corner point (Sim-1).

At block 520, method 500 may build the five diagonal points of the simulation timing table using the two simulated corner points and using geometric progression interpolation. For instance, in reference to FIG. 2B, the diagonal points for the timing table 202B may refer to five (5) diagonal points (Sim-3, Sim-4, Sim-5, Sim-6, Sim-7) along a central diagonal between the first corner point (Sim-1) and the second corner point (Sim-2).

At decision block 530, in reference to the diagonal points of the simulation timing table, method 500 may determine whether linearity of the interpolated line meets a specified accuracy, and in some instances, this determination in decision block 530 may be based on a preset/default accuracy input from block 560. If no, then method proceeds from decision block 530 to block 540 to simulate one or more additional diagonal points where accuracy may appear inaccurate. Next, at block 550, method 500 may then rebuild the diagonal points using the additional diagonal points and using geometric progression interpolation, and then method 500 returns to decision block 530. Otherwise, from decision block 530, if yes, then method 500 may build the remaining forty-two points of the simulation timing table using the delta approach. For instance, in reference to FIG. 2C, the remaining points for the timing table 202C may refer to forty-two (42) remaining points (sim) that fill the timing table 202C above and below the central diagonal.

In some instances, as described herein in reference to FIGS. 2A-2C, the scalable number (S) of points may refer to forty-nine (49) points, and the first number (N) of columns may refer to seven (7) columns, and the second number (M) of rows may refer to seven (7) rows. However, it should be appreciated that the simulation timing table may be scalable to any number of simulated points. For instance, in various implementations, the simulation timing table may include a scalable number (S) of points that are arranged with a first number (N) of columns and a second number (M) of rows, and also, the scalable number of points includes (S=N*M) points that are arranged with N columns and M rows.

Figure 6:
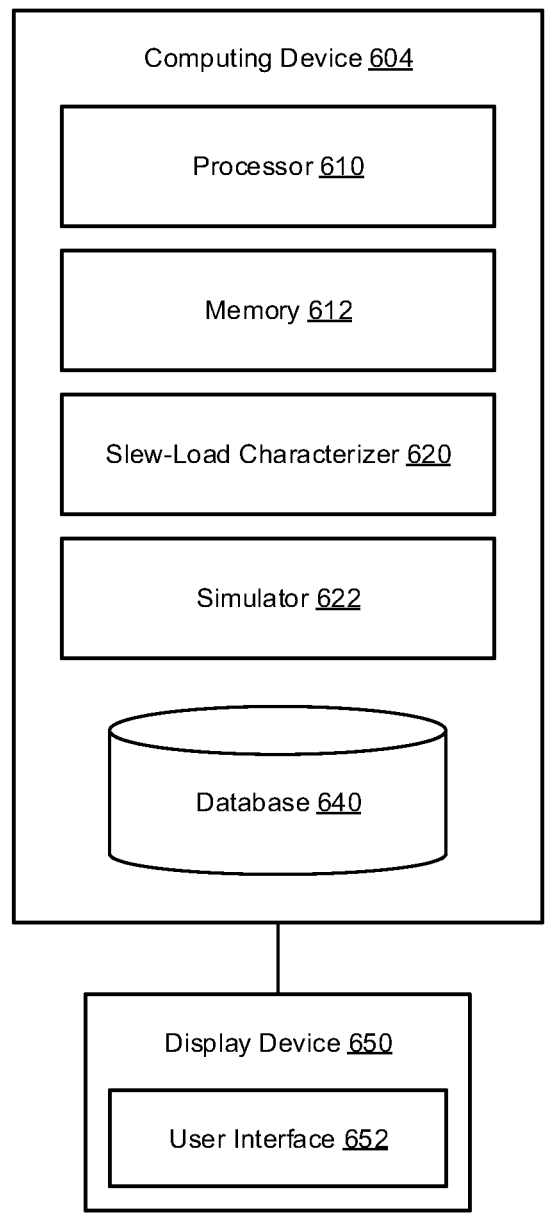
FIG. 6 illustrates a system for providing slew-load characterization in physical design in accordance with implementations described herein.

FIG. 6 shows a system 600 for providing slew-load characterization techniques in physical design in accordance with implementations described herein.

In reference to FIG. 6, the system 600 may be associated with a computer or a computing device 604 that is implemented as a special purpose machine for providing slew-load characterization techniques in physical design, as described herein. In some instances, the computing device 604 may refer to an apparatus having any standard element(s) and/or component(s), including at least one processor(s) 610, memory 612 (e.g., non-transitory computer-readable storage medium), one or more database(s) 640, power, peripherals, and various other computing elements and/or components that may not be specifically shown in FIG. 6. The computing device 604 may include instructions recorded or stored on the non-transitory computer-readable medium 612 that are executable by the at least one processor 610. The computing device 604 may be associated with a display device 650 (e.g., monitor or other display) that may be used to provide a user interface (UI) 652, such as, e.g., a graphical user interface (GUI). In some instances, the UI 652 may be used to receive various parameters and/or preferences from a user for managing, operating, and/or controlling the computing device 604. Thus, the computing device 604 may include the display device 650 for providing various types of output to a user, and also, the display device 650 may include the UI 652 for receiving various types of input from the user.

As shown in reference to FIG. 6, the computing device 604 may include a slew-load characterizer 620 that may be configured to cause the processor 610 to implement slew-load characterization schemes and techniques described herein in reference to FIGS. 1A-5, including methodologies related to implementing various related integrated circuitry (IC) in physical design. The slew-load characterizer 620 may be implemented in hardware and/or software. For instance, if implemented in software, the slew-load characterizer 620 may be stored in memory 612 or database 640. Also, in some instances, if implemented in hardware, the slew-load characterizer 620 and related components may refer to a separate processing component that is configured to interface with the processor 610.

In some instances, the slew-load characterizer 620 may be configured to cause the at least one processor 610 to perform various operations, as provided herein in reference to slew-load characterization schemes and techniques described in FIGS. 1A-5. Also, the memory 612 includes instructions stored thereon that, when executed by the processor 610, cause the processor 610 to perform one or more or all of the following operations.

For instance, the slew-load characterizer 620 may be configured to cause the at least one processor 610 to perform an operation of constructing integrated circuitry. In some instances, the integrated circuitry may refer to chip-level SoC circuitry. In some instances, constructing the integrated circuitry may refer to generating a liberty model for the integrated circuitry having timing data and power data with multiple clock slews, multiple input slews and/or multiple output loads depending on a timing arc.

The slew-load characterizer 620 may be configured to cause the at least one processor 610 to perform an operation of identifying input signal paths, internal signal paths and output signal paths associated with the integrated circuitry.

In some instances, the input signal paths may refer to input clock signal paths and input data signal paths associated with various logic within the integrated circuitry. Also, in some instances, the internal signal paths may refer to internal clock signal paths and internal data signal paths associated with the various logic within the integrated circuitry. In addition, the output signal paths may refer to delay signal paths associated with output from the integrated circuitry.

The slew-load characterizer 620 may be configured to cause the at least one processor 610 to perform an operation of generating (or developing) a timing table for slew-load characterization of the input signal paths, the internal signal paths and the output signal paths. In some instances, generating the timing table may include simulating corner points for the timing table, building the diagonal points for the timing table using the simulated corner points and using geometric progression interpolation, and building remaining points for the timing table using a delta approach. In some instances, the slew-load characterization refers to timing, power and/or model data for slew/load variation for setup, hold, delay and/or pin-power arcs. Also, the model data may include liberty variation format (LVF) model data and non-linear delay (NLD) model data for slew/load variation.

In various implementations, the timing table may include multiple points arranged in a two-dimensional (2D) grid pattern with columns and rows, and the multiple points may have point values associated with simulation values. The timing table may include a scalable number (S) of points that are arranged with a first number (N) of columns and with a second number (M) of rows, and also, the scalable number of points may include (S=N*M) points that are arranged with N columns and with M rows.

In accordance with various implementations described in reference to FIGS. 1A-5, any one or more or all of these operations performed by the slew-load characterizer 620 may be altered, modified, or changed to thereby provide the various specific embodiments as shown in FIGS. 1A-5. Further, the slew-load characterization schemes and techniques described herein may be used to provide various integrated circuitry in a form of a logic block or module having a physical structure that is included in a place-and-route environment for electronic design automation (EDA) tools for related EDA systems.

Further, in reference to FIG. 6, the computing device 604 may include a simulator 622 that is configured to cause the processor 610 to generate one or more simulations of the integrated circuitry. The simulator 622 may be referred to as a simulating component and/or module that may be implemented in hardware and/or software. If implemented in software, the simulator 622 may be recorded or stored in memory 612 or database 640. If implemented in hardware, the simulator 620 may refer to a separate processing component configured to interface with the processor 610. In some instances, the simulator 622 may refer to a SPICE simulator that is configured to generate SPICE simulations of integrated circuitry. Generally, SPICE is an acronym for Simulation Program with Integrated Circuit Emphasis, which is an open source analog electronic circuit simulator. Also, SPICE may refer to a general-purpose software program used by the semiconductor industry to check integrity of integrated circuit designs and to predict behavior of integrated circuit designs. Thus, in some implementations, the slew-load characterizer 620 may be configured to interface with the simulator 622 so as to generate various timing data and information based on one or more simulations (including, e.g., SPICE simulations) of integrated circuitry that may be utilized for analyzing performance characteristics of integrated circuitry including timing data of integrated circuitry. Further, the slew-load characterizer 620 may be configured to use simulations (e.g., SPICE simulations) of integrated circuitry for evaluating operating behavior and conditions thereof.

In some instances, the computing device 604 may include one or more databases 640 configured to store and/or record various data and information related to implementing slew-rate characterization schemes and techniques in physical design. In various instances, the database(s) 640 may be configured to store and/or record data and information related to integrated circuitry, operating conditions, operating behavior and/or timing data. Also, the database(s) 640 may be configured to store data and information related to the integrated circuitry and timing data in reference to simulation data (e.g., SPICE simulation data).

It should be intended that the subject matter recited in the claims not be limited to the implementations and illustrations provided herein, but include modified forms of those implementations including portions of implementations and combinations of various elements of different implementations in accordance with the claims. It should be appreciated that in development of any such implementation, as in any engineering or design project, numerous implementation-specific decisions should be made to achieve developers' specific goals, such as compliance with system-related and business related constraints, which may vary from one implementation to another. Also, it should be appreciated that such a development effort may be complex and time consuming, but would nevertheless be a routine undertaking of design, fabrication, and/or manufacture for those of ordinary skill having benefit of this disclosure.

Described herein are various implementations of a method. The method may include constructing integrated circuitry and identifying input signal paths, internal signal paths and output signal paths associated with the integrated circuitry. The method may include generating a timing table for slew-load characterization of the input signal paths, the internal signal paths and the output signal paths. The method may include simulating corner points for the timing table, building diagonal points for the timing table based on the simulated corner points, and building remaining points for the timing table based on the simulated corner points and the diagonal points.

Described herein are various implementations of an apparatus. The apparatus may include a processor and memory having instructions stored thereon that, when executed by the processor, cause the processor to construct integrated circuitry and identify input signal paths, internal signal paths and output signal paths associated with the integrated circuitry. The instructions may cause the processor to generate a timing table for slew-load characterization of the input signal paths, the internal signal paths and the output signal paths. The instructions may cause the processor to simulate corner points for the timing table, build diagonal points for the timing table based on the simulated corner points, and build remaining points for the timing table based on the simulated corner points and the diagonal points.

Described herein are various implementations of a non-transitory computer-readable medium having computer-executable instructions stored thereon that, when executed by a computer, cause the computer to construct integrated circuitry and identify input signal paths, internal signal paths and output signal paths associated with the integrated circuitry. The instructions may cause the processor to generate a timing table for slew-load characterization of the input signal paths, the internal signal paths and the output signal paths. The instructions may cause the processor to simulate corner points for the timing table, build diagonal points for the timing table based on the simulated corner points, and build remaining points for the timing table based on the simulated corner points and the diagonal points.

Reference has been made in detail to various implementations, examples of which are illustrated in the accompanying drawings and figures. In the following detailed description, numerous specific details are set forth to provide a thorough understanding of the disclosure provided herein. However, the disclosure provided herein may be practiced without these specific details. In some other instances, well-known methods, procedures, components, circuits and networks have not been described in detail so as not to unnecessarily obscure details of the embodiments.

It should also be understood that, although the terms first, second, etc. may be used herein to describe various elements, these elements should not be limited by these terms. These terms are only used to distinguish one element from another. For example, a first element could be termed a second element, and, similarly, a second element could be termed a first element. The first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised in accordance with the disclosure herein, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
constructing integrated circuitry;
identifying input signal paths, internal signal paths and output signal paths associated with the integrated circuitry, wherein the input signal paths refer to input clock signal paths and the internal signal paths refer to internal clock signal paths associated with logic within the integrated circuitry; and
generating a timing table for slew-load characterization of the input signal paths, the internal signal paths and the output signal paths, including:
simulating corner points for the timing table;
building diagonal points for the timing table based on the simulated corner points; and
building remaining points for the timing table based on the simulated corner points and the diagonal points.

2. The method of claim 1, wherein the integrated circuitry refers to chip-level circuitry for a system-on-a-chip (SoC), and wherein:
building the diagonal points for the timing table is achieved using geometric progression interpolation, and
building the remaining points for the timing table is achieved using a delta approach.

3. The method of claim 1, wherein constructing integrated circuitry refers to generating a liberty model for the integrated circuitry having timing data and power data with multiple clock slews, multiple input slews and multiple output loads depending on a timing arc.

4. The method of claim 1, wherein:
the input signal paths refer to the input clock signal paths and input data signal paths associated with the logic within the integrated circuitry,
the internal signal paths refer to the internal clock signal paths and internal data signal paths associated with the logic within the integrated circuitry, and
the output signal paths refer to delay signal paths associated with output from the integrated circuitry.

5. The method of claim 1, wherein the slew-load characterization refers to timing, power and model data for slew/load variation for setup, hold, delay and pin-power arcs, and wherein the model data includes liberty variation format (LVF) model data and non-linear delay (NLD) model data for slew/load variation.

6. The method of claim 1, wherein the timing table includes multiple points arranged in a two-dimensional (2D) grid pattern with columns and rows, and wherein the multiple points have point values associated with simulation values.

7. The method of claim 1, wherein the timing table includes a scalable number (S) of points that are arranged with a first number (N) of columns and a second number (M) of rows, and wherein the scalable number of points includes (S=N*M) points that are arranged with N columns and M rows.

8. The method of claim 7, wherein the scalable number (S) of points refers to forty-nine (49) points, wherein the first number (N) of columns refers to seven (7) columns, and wherein the second number (M) of rows refers to seven (7) rows.

9. The method of claim 8, wherein:
the corner points for the timing table refer to a first corner point and a second corner point that is opposite the first corner point,
the diagonal points for the timing table refer to five (5) diagonal points along a central diagonal between the first corner point and the second corner point, and the remaining points for the timing table refer to forty-two (42) remaining points that fill the timing table above and below the central diagonal.

10. An apparatus, comprising:
a processor; and
memory having instructions stored thereon that, when executed by the processor, cause the processor to:
construct integrated circuitry;
identify input signal paths, internal signal paths and output signal paths associated with the integrated circuitry, wherein the input signal paths refer to input clock signal paths and the internal signal paths refer to internal clock signal paths associated with logic within the integrated circuitry; and
generate a timing table for slew-load characterization of the input signal paths, the internal signal paths and the output signal paths, including:
simulating corner points for the timing table;
building diagonal points for the timing table based on the simulated corner points, and
building remaining points for the timing table based on the simulated corner points and the diagonal points.

11. The apparatus of claim 10, wherein:
building the diagonal points for the timing table is achieved using geometric progression interpolation, and
building the remaining points for the timing table is achieved using a delta approach.

12. The apparatus of claim 10, wherein:
the input signal paths refer to the input clock signal paths and input data signal paths associated with the logic within the integrated circuitry,
the internal signal paths refer to the internal clock signal paths and internal data signal paths associated with the logic within the integrated circuitry, and
the output signal paths refer to delay signal paths associated with output from the integrated circuitry.

13. The apparatus of claim 10, wherein:
constructing integrated circuitry refers to generating a liberty model for the integrated circuitry having timing data and power data with multiple clock slews, multiple input slews and multiple output loads depending on a timing arc, and
the slew-load characterization refers to timing, power and model data for slew/load variation for setup, hold, delay and pin-power arcs, and wherein the model data includes liberty variation format (LVF) model data and non-linear delay (NLD) model data for slew/load variation.

14. The apparatus of claim 10, wherein the timing table includes multiple points arranged in a two-dimensional (2D) grid pattern with columns and rows, and wherein the multiple points have point values associated with simulation values.

15. The apparatus of claim 10, wherein the timing table includes a scalable number (S) of points that are arranged with a first number (N) of columns and a second number (M) of rows, and wherein the scalable number of points includes (S=N*M) points that are arranged with N columns and M rows.

16. The apparatus of claim 15, wherein the scalable number (S) of points refers to forty-nine (49) points, wherein the first number (N) of columns refers to seven (7) columns, and wherein the second number (M) of rows refer to seven (7) rows.

17. The apparatus of claim 16, wherein:
the corner points for the timing table refer to a first corner point and a second corner point that is opposite the first corner point,
the diagonal points for the timing table refer to five (5) diagonal points along a central diagonal between the first corner point and the second corner point, and
the remaining points for the timing table refer to forty-two (42) remaining points that fill the timing table above and below the central diagonal.

18. A non-transitory computer-readable medium having computer-executable instructions stored thereon that, when executed by a computer, cause the computer to:
construct integrated circuitry;
identify input signal paths, internal signal paths and output signal paths associated with the integrated circuitry, wherein the input signal paths refer to input clock signal paths and the internal signal paths refer to internal clock signal paths associated with logic within the integrated circuitry; and
generate a timing table for slew-load characterization of the input signal paths, the internal signal paths and the output signal paths, including:
simulating corner points for the timing table;
building diagonal points for the timing table based on the simulated corner points; and
building remaining points for the timing table based on the simulated corner points and the diagonal points.

19. The computer-readable medium of claim 18, wherein:
building the diagonal points for the timing table is achieved using geometric progression interpolation,
building the remaining points for the timing table is achieved using a delta approach,
the input signal paths refer to the input clock signal paths and input data signal paths associated with the logic within the integrated circuitry,
the internal signal paths refer to the internal clock signal paths and internal data signal paths associated with the logic within the integrated circuitry, and
the output signal paths refer to delay signal paths associated with output from the integrated circuitry.

20. The computer-readable medium of claim 18, wherein:
the timing table includes multiple points arranged in a two-dimensional (2D) grid pattern with columns and rows,
the multiple points have point values associated with simulation values,
the timing table includes a scalable number (S) of points that are arranged with a first number (N) of columns and a second number (M) of rows, and
the scalable number of points includes (S=N*M) points that are arranged with N columns and M rows.

* * * * *